(12) United States Patent
Kominato et al.

(10) Patent No.: US 11,077,790 B2
(45) Date of Patent: Aug. 3, 2021

(54) SLIDE DEVICE AND LIGHT EMITTING DEVICE FOR SLIDE DEVICE

(71) Applicant: Yazaki Corporation, Tokyo (JP)

(72) Inventors: Yasuhiro Kominato, Makinohara (JP); Goro Nakamura, Makinohara (JP)

(73) Assignee: Yazaki Corporation, Tokyo (JP)

( * ) Notice: Subject to any disclaimer, the term of this patent is extended or adjusted under 35 U.S.C. 154(b) by 2 days.

(21) Appl. No.: 16/848,178

(22) Filed: Apr. 14, 2020

(65) Prior Publication Data
US 2020/0361372 A1 Nov. 19, 2020

(30) Foreign Application Priority Data

May 15, 2019 (JP) .............................. JP2019-092376

(51) Int. Cl.
*B60Q 3/53* (2017.01)
*B60Q 3/233* (2017.01)
*B60N 2/07* (2006.01)
*B60Q 3/50* (2017.01)
*F21W 106/00* (2018.01)
*B60Q 3/00* (2017.01)

(52) U.S. Cl.
CPC ................. *B60Q 3/53* (2017.02); *B60N 2/07* (2013.01); *B60Q 3/233* (2017.02); *B60Q 3/50* (2017.02); *B60Q 3/00* (2013.01); *F21W 2106/00* (2018.01)

(58) Field of Classification Search
CPC . B60Q 3/53; B60Q 3/233; B60Q 3/00; B60Q 3/50; B60Q 3/51; B60Q 3/70; B60Q 3/20; B60N 2/06; B60N 2/07; B60N 2/0702; B60N 2/0705; B60N 2/071; B60N 2/0712; B60N 2/0715; B60N 2/0717; B60N 2/072; B60N 2/705; B60N 2/715; B60N 2/725; B60N 99/00; F21W 2111/00; F21W 2106/00
USPC .................. 248/542, 429, 430; 362/488, 459
See application file for complete search history.

(56) References Cited

U.S. PATENT DOCUMENTS

| 9,694,741 B2 * | 7/2017 | Salter ...................... B60N 2/986 |
| 2014/0206302 A1 * | 7/2014 | Terada ................. B60N 2/0715 455/90.1 |

FOREIGN PATENT DOCUMENTS

| EP | 3 738 818 | * 11/2020 |
| JP | 2013-067322 A | 4/2013 |
| WO | 03/055726 A1 | 7/2003 |

* cited by examiner

*Primary Examiner* — Laura K Tso
(74) *Attorney, Agent, or Firm* — Banner & Witcoff, Ltd.

(57) ABSTRACT

A slide device includes an upper rail to which a slide seat for a vehicle is attached, a slide rail to which the upper rail is slidably attached, a light emitter, and an attachment portion that attaches the light emitter to the upper rail. The attachment portion is attached to the upper rail such that the light emitter is arranged outside the slide rail. According to the slide device, since the attachment portion is attached to the upper rail such that the light emitter is positioned outside the slide rail, the light emitter does not move inside the slide rail to which a large amount of grease is applied, and a decrease in communication performance can be prevented.

7 Claims, 8 Drawing Sheets

SLIDE DEVICE AND LIGHT EMITTING DEVICE FOR SLIDE DEVICE

CROSS-REFERENCE TO RELATED APPLICATIONS

This application is based on and claims priority under 35 USC 119 from Japanese Patent Application No. 2019-092376 filed on May 15, 2019, the contents of which are incorporated herein by reference.

TECHNICAL FIELD

The present disclosure relates to a slide device that slides a slide seat for a vehicle, and a light emitting device for the slide device.

BACKGROUND ART

In the related art, a signal transmission and reception device described in JP2013-067322A has been proposed as a device that transmits information on a slide seat for a vehicle. According to the signal transmission and reception device described above, an LED (light emitter) is attached to a lower surface of the slide seat, and to an upper rail slidably attached to a slide rail. Information on an electronic device such as a seating sensor provided in the slide seat is transmitted using the LED.

However, the LED described above slides inside the slide rail to which a large amount of grease is applied. Therefore, the grease inside the slide rail may adhere to the LED, and communication performance may decrease due to influence of scattering, shielding, or the like of light which is caused by the grease.

SUMMARY OF INVENTION

The present disclosure is to provide a slide device capable of preventing a decrease in communication performance and a light emitting device for the slide device.

According to a first illustrative aspect of the present disclosure, a slide device includes an upper rail to which a slide seat for a vehicle is attached, a slide rail to which the upper rail is slidably attached, a light emitter, and an attachment portion that attaches the light emitter to the upper rail. The attachment portion is attached to the upper rail such that the light emitter is arranged outside the slide rail.

According to a second illustrative aspect of the present disclosure, the slide rail includes a bottom wall that is mounted on a floor, a pair of side walls that are vertically arranged from both sides of the bottom wall extending in an orthogonal direction orthogonal to a sliding direction on the bottom wall in which the upper rail moves along the slide rail, a pair of upper walls that extend to approach each other from upper ends of the pair of side walls in an erecting direction in which the pair of side walls are vertically arranged, and a pair of inner walls that extend downward for the floor from end portions of the pair of upper walls, the end portions of the pair of upper walls being separated from the upper ends of the pair of side walls in a direction in which the pair of upper walls extend. The attachment portion is attached to the upper rail such that the light emitter is arranged between the pair of inner walls.

According to a third illustrative aspect of the present disclosure, a cover member that is arranged over the slide rail. The slide rail includes a slit, and the cover member covers the slit of the slide rail. The upper rail includes a slide portion that is arranged inside the slide rail, and a seat attachment portion that protrudes from inside the slide rail to outside the slide rail through the slit of the slide rail, and to which the slide seat for the vehicle is attached. The seat attachment portion protrudes from below the cover member to above the cover member through the cover member. The attachment portion is attached to the upper rail such that the light emitter is arranged between the slide rail and the cover member.

According to a fourth illustrative aspect of the present disclosure, a bolt that is configured to attach the slide seat for the vehicle is provided in the upper rail. A hole through which the bolt is passed is formed in the attachment portion, and the attachment portion is attached to the upper rail with the bolt.

According to a fifth illustrative aspect of the present disclosure, a light emitting device for a slide device includes a light emitter, and an attachment portion that attaches the light emitter to an upper rail to which a slide seat for the vehicle is attached. The attachment portion is attached to the upper rail such that the light emitter is arranged outside a slide rail to which the upper rail is slidably attached.

According to the first to fifth illustrative aspects, since the attachment portion is attached to the upper rail such that the light emitter is positioned outside the slide rail, the light emitter does not move inside the slide rail to which a large amount of grease is applied, and a decrease in communication performance can be prevented.

According to the second illustrative aspect, the attachment portion is attached to the upper rail such that the light emitter is positioned between the pair of inner walls. Since no grease is applied to inner sides of the pair of inner walls, the decrease in the communication performance can be prevented.

According to the third illustrative aspect, the attachment portion is attached to the upper rail such that the light emitter is positioned between the slide rail and the cover member. Even outside the slide rail, influence of disturbance light can be prevented by the cover member.

According to the fourth illustrative aspect, it is possible to easily attach the light emitter by using a bolt used for attaching the slide seat for the vehicle.

According to the present disclosure, it is possible to provide a slide device capable of reducing influence of grease and preventing a decrease in communication performance.

The present disclosure is briefly described as above. Further, details of the present disclosure will be clarified by reading a mode for carrying out the present disclosure (hereinafter, referred to as "embodiments") described below with reference to the accompanying drawings.

DESCRIPTION OF EMBODIMENTS

Specific embodiments of the present disclosure will be described below with reference to the drawings.

Figure 1:
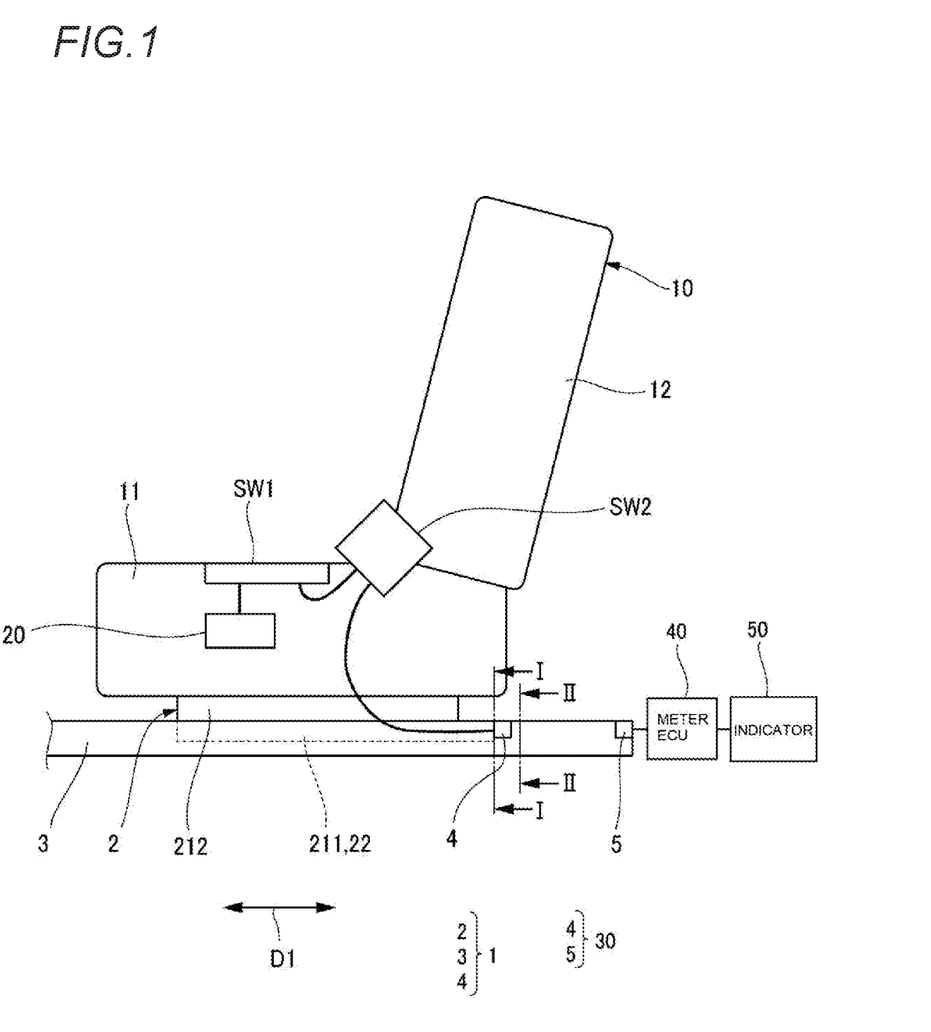
FIG. 1 is a schematic side view illustrating an embodiment of a slide device of the present disclosure.

As illustrated in FIG. 1, a slide device 1 includes an upper rail 2 on which a slide seat for a vehicle 10 is mounted, a slide rail 3 to which the upper rail 2 is slidably attached, and a light emitting device 4 that is attached to the upper rail 2. The light emitting device 4 and a light receiving device 5 to be described below constitute a communication system 30. The communication system 30 is an optical communication system for transmitting information on an electronic device (a seating switch SW1 and a buckle switch SW2 in the present embodiment) mounted on the slide seat 10 for the vehicle, to an electronic device (a meter ECU 40 in the present embodiment) provided on a vehicle body side.

The slide seat 10 mainly includes a seat cushion 11 and a seat back 12. With the upper rail 2 that is attached to a lower surface of the seat cushion 11, and with the slide rail 3 that is disposed below the seat cushion 11 and to which the upper rail 2 is slidably attached, the slide seat 10 is slidable along a longitudinal direction D1 (sliding direction) of the slide rail 3.

In the present embodiment, the slide seat 10 is provided with the seating switch SW1, the buckle switch SW2, and a battery 20.

The seating switch SW1 is one of electronic devices mounted on the slide seat 10. The seating switch SW1 is, for example, disposed in the seat cushion 11, is pressed to be turned ON when an occupant sits on the slide seat 10, and is turned OFF when the occupant gets out of the slide seat 10.

The buckle switch SW2 is one of the electronic devices mounted on the slide seat 10. The buckle switch SW2 is provided in a buckle of a seat belt, is turned OFF when a tongue is inserted into the buckle of the seat belt, and is turned ON when the tongue is pulled out.

Figure 2:
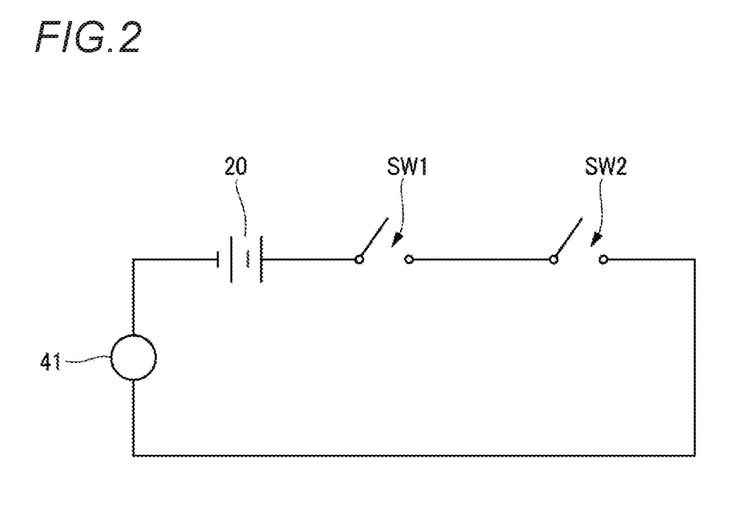
FIG. 2 is an electrical configuration diagram illustrating a battery, a seating switch, a buckle switch, and an LED which are illustrated in FIG. 1.

As illustrated in FIG. 2, the battery 20 supplies power to a light emitting diode (hereinafter referred to as "LED") 41 serving as a light emitter of the light emitting device 4, which will be described below, via the seating switch SW1 and the buckle switch SW2 that are connected in series.

Figure 3:
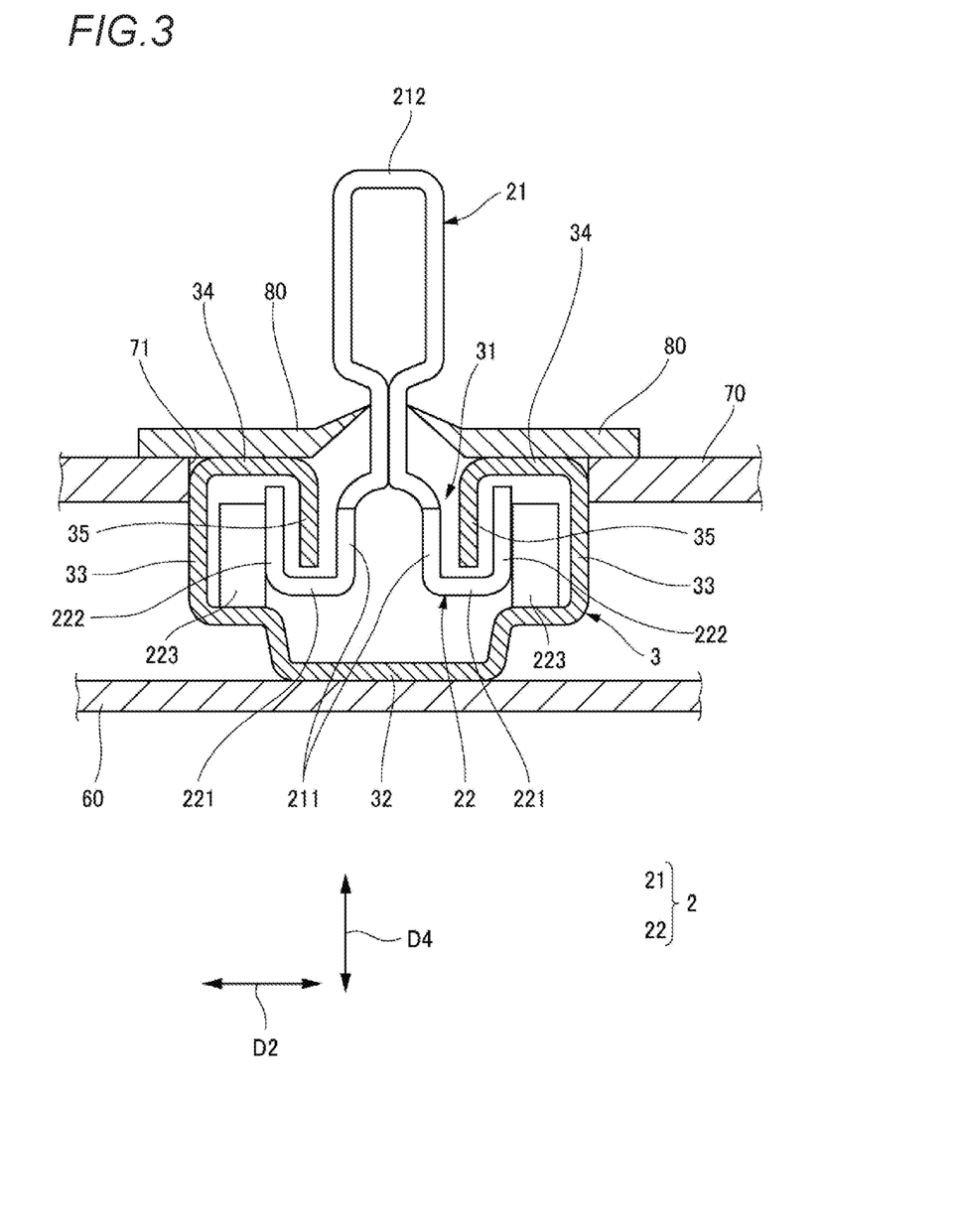
FIG. 3 is a partial cross-sectional view taken along a line I-I of FIG. 1.

The upper rail 2 is obtained by subjecting a metal plate to roll forming, pressing, welding, and the like. As illustrated in FIG. 3, the upper rail 2 is positioned outside the slide rail 3, and includes a seat attachment portion 21 to which the slide seat 10 is attached, and a slide portion 22 positioned inside the slide rail 3.

Next, the slide rail 3 will be described before describing details of the upper rail 2. The slide rail 3 is formed in an elongated tubular shape with a metal plate, and a slit 31 extending in the longitudinal direction D1 is formed in an upper surface thereof. The seat attachment portion 21 of the upper rail 2 protrudes from the slit 31 to the outside of the slide rail 3.

The slide rail 3 has a bottom wall 32 provided in an elongated shape in the longitudinal direction D1, a pair of side walls 33, a pair of upper walls 34, and a pair of inner walls 35. The bottom wall 32 overlaps with a floor panel 60 (floor) of an automobile. The pair of side walls 33 is vertically arranged from both ends in a width direction D2 (orthogonal direction) of the bottom wall 32. The pair of upper walls 34 extends in directions to approach each other from upper ends in an upper-lower direction D4 (vertically arranged direction) of the pair of side walls 33. The pair of inner walls 35 sag (extend downward for the floor 60) from end portions, of the pair of upper walls 34, separated from the side walls 33. The slide rail 3 is formed to have the same cross-sectional shape from one end all along to the other end in the longitudinal direction D1.

Grease is applied to an upper surface of the bottom wall 32, inner side surfaces in the width direction D2 of the pair of side walls 33, lower surfaces of the pair of upper walls 34, and outer side surfaces in the width direction D2 of the pair of inner walls 35, all of which define the inside of the slide rail 3, so that the upper rail 2 is easy to slide. The slit 31 described above refers to a space between the pair of inner walls 35. The grease is not applied to inner side surfaces in the width direction D2 of the pair of inner walls 35.

A mat 70 is disposed above the floor panel 60, and the upper wall 34 of the slide rail 3 is exposed from a slit 71 provided in the mat 70. A pair of moors (cover members) 80 is attached to the pair of upper walls 34 of the slide rail 3. The pair of moors 80 covers the slit 31 to prevent foreign matters from entering the slide rail 3. Further, the seat attachment portion 21 of the upper rail 2 passes between the pair of moors 80 and protrude from below the moors 80 to above the moors 80.

Next, details of the upper rail 2 will be described. The seat attachment portion 21 includes a pair of outer side walls 211 and an attachment body 212. The pair of outer side walls 211 is arranged side by side in the width direction D2 between the pair of inner walls 35, that is, in the slit 31. The attachment body 212 is bent in a rectangular tube shape and is connected to upper ends of the pair of outer side walls 211. As illustrated in FIG. 1, the attachment body 212 is provided to be shorter than the pair of outer side walls 211 in the longitudinal direction D1; the pair of outer side walls 211, and the slide portion 22 to be described below protrude more than the attachment body 212 at one end side in the longitudinal direction D1.

The slide portion 22 has a pair of bottom walls 221 that are provided in an elongated shape in the longitudinal direction D1 and a pair of inner side walls 222. The pair of bottom walls 221 is arranged on a lower side of lower ends of the pair of inner walls 35, and the pair of outer side walls 211 is vertically arranged from end portions thereof on an inner side in the width direction D2. The pair of inner side walls 222 is vertically arranged from an outer side in the width direction D2 of the bottom walls 221 and is arranged inside the slide rail 3. Wheels 223 running on the bottom wall 32 of the slide rail 3 are attached on an outer side in the width direction D2 of the inner side walls 222.

Figure 4:
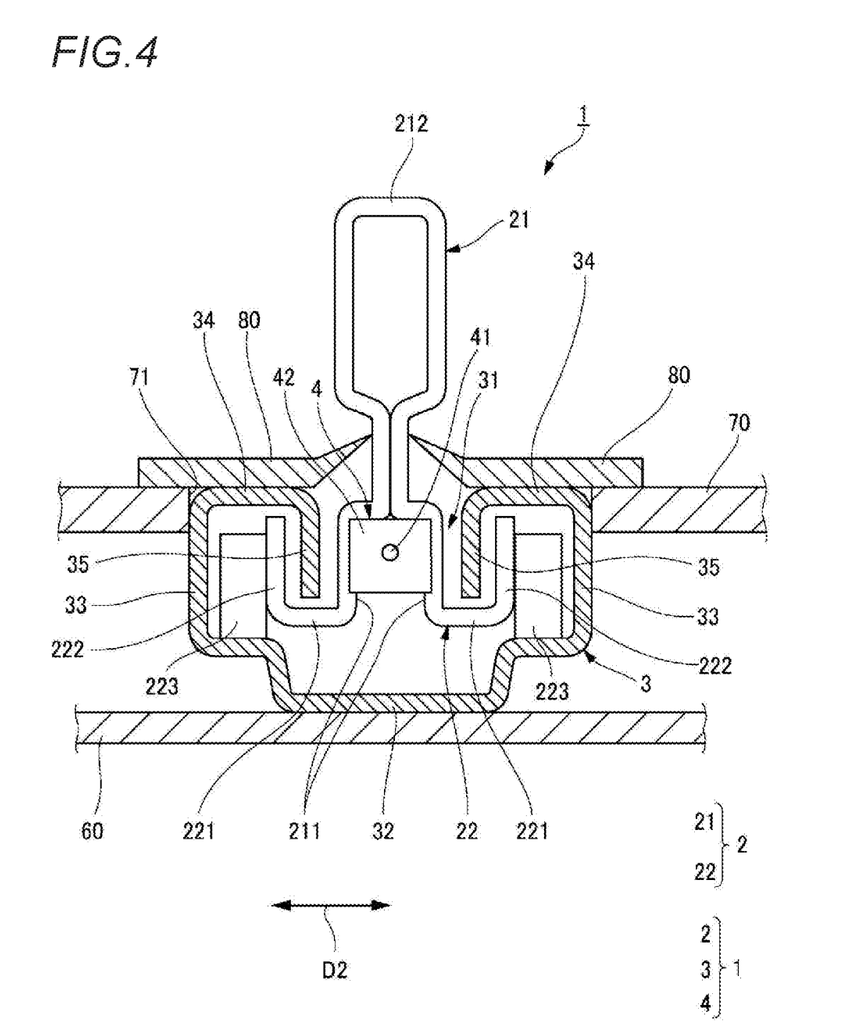
FIG. 4 is a partial cross-sectional view taken along a line II-II of FIG. 1.
Figure 5:
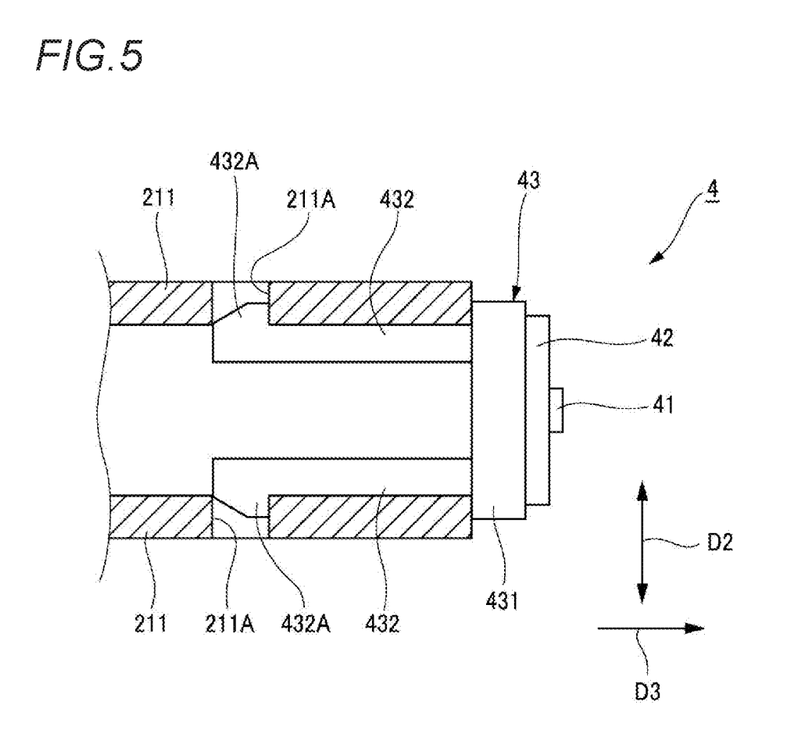
FIG. 5 is a partial side view of the light emitting device and of an upper rail which are illustrated in FIG. 1.
Figure 6:
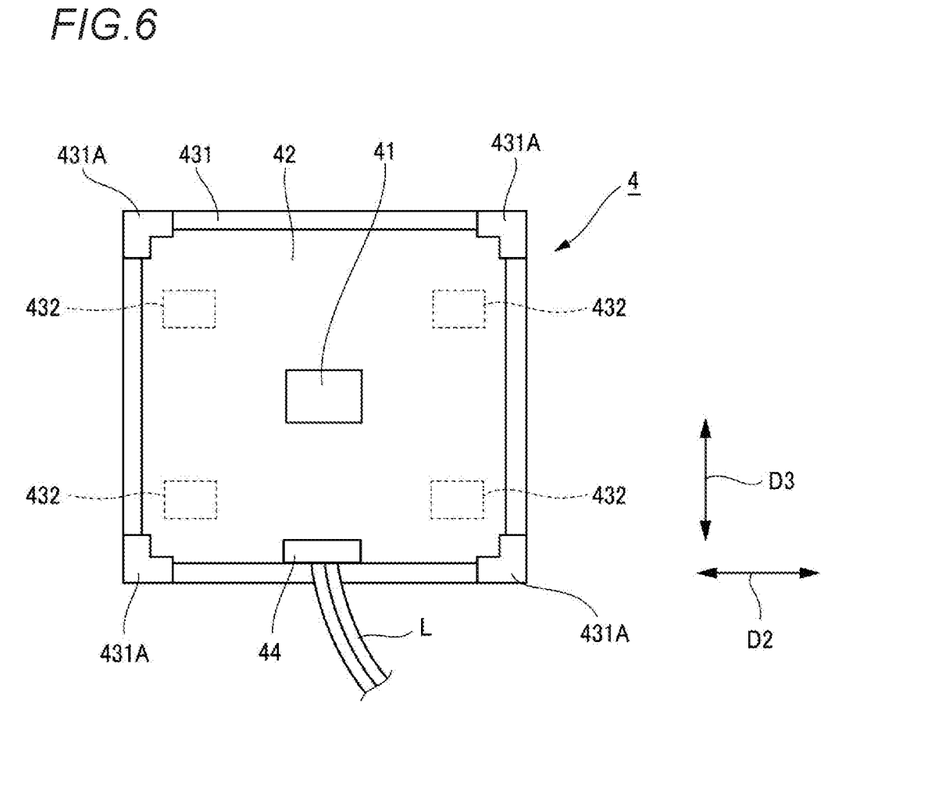
FIG. 6 is a front view of the light emitting device illustrated in FIG. 1.

As illustrated in FIGS. 4 to 6, the light emitting device 4 includes an LED 41, a substrate 42 on which the LED 41 is mounted, and a holding portion 43 (attachment portion) that holds the substrate 42 slidably inside the slide rail 3 and that is attached to the upper rail 2. As illustrated in FIG. 2, the LED 41 is connected to the battery 20 via the seating switch SW1 and the buckle switch SW2. Accordingly, when an occupant is seated and the seat belt is not worn, both the seating switch SW1 and the buckle switch SW2 are turned on, power is supplied from the battery 20 to the LED 41, and the LED 41 emits light. The LED 41 is held by the holding portion 43, which will be described below, such that an irradiation direction D3 thereof is along the longitudinal direction D1 of the slide rail 3.

The substrate 42 is provided in a substantially rectangular shape as viewed from the top, and is disposed inside the slide rail 3 to be perpendicular to the longitudinal direction D1. A connector 44 is mounted on the board 42, and an electric wire L drawn out from the connector 44 is connected to the seating switch SW1 and the buckle switch SW2.

The holding portion 43 is formed of a synthetic resin. As illustrated in FIGS. 5 and 6, the holding portion 43 includes a holding body 431 that holds the substrate 42, and locking arms 432 that are locked to the pair of outer side walls 211. The holding body 431 is formed in a plate shape and covers a side, of the substrate 42, opposite to the LED 41, and is provided with holding claws 431A that hold four corners of the substrate 42.

The locking arms 432 protrude from the holding body 431 toward a side opposite to the irradiation direction D3, and the locking claws 432A protruding toward an outer side in the width direction D2 are provided at tip ends thereof. Each of the pair of outer side walls 211 is provided with locking holes 211A that penetrate in the width direction D2 and in which the locking claws 432A of the locking arms 432 are locked. Two locking holes 211A are provided side by side in an upper-lower direction D4 in each of the pair of outer side walls 211. Two locking arms 432 arranged side by side in the upper-lower direction D4 are provided on each side in the width direction D2. That is, four locking arms 432 are provided.

These four locking arms 432 are inserted between the pair of outer side walls 211. Accordingly, two locking arms 432 on one side in the width direction D2 are locked to the locking holes 211A, of one of the pair of outer side walls 211, provided on one side in the width direction D2. Further, two locking arms 432 on the other side in the width direction D2 are locked to the locking holes 211A, of the other of the pair of outer side walls 211, provided on the other side in the width direction.

Accordingly, as illustrated in FIG. 4, the LED 41 held by the holding portion 43 is accommodated between the pair of inner walls 35 of the slide rail 3. This space is a space between the moor 80 and the slide rail 3. Further, the LED 41 of the holding portion 43 is locked to one end portion in the longitudinal direction D1 of the seat attachment portion 21 (outer side walls 211) of the upper rail 2 by the locking arms 432. As described above, by locking the holding portion 43 to the upper rail 2, the holding portion 43 slides in conjunction with sliding of the upper rail 2 and of the slide seat 10.

As illustrated in FIG. 1, the light receiving device 5 has a photodiode (not illustrated). The light receiving device 5 is disposed such that the LED 41 of the light emitting device 4 and the photodiode face each other in the longitudinal direction D1. Accordingly, the photodiode detects light from the LED 41, and notifies the meter ECU 40 that the occupant is seated and the seat belt is not worn. In a case where the light receiving device 5 detects light emitted from the LED 41 when an ignition is turned on and a vehicle speed is, for example, equal to or greater than 3 km/h, the meter ECU 40 determines that the occupant is not wearing the seat belt, and displays that as a warning on an indicator 50.

According to the slide device 1 configured as described above, since the holding portion 43 is attached to the upper rail 2 such that the LED 41 is positioned outside the slide rail 3, the LED 41 does not move inside the slide rail 3 to which a large amount of grease is applied, and a decrease in communication performance can be prevented.

According to the slide device 1 configured as described above, the holding portion 43 is attached to the upper rail 2 such that the LED 41 is positioned between the pair of inner side walls 222. Since no grease is applied to the pair of inner side walls 222, a decrease in the communication performance can be prevented.

According to the slide device 1 configured as described above, the holding portion 43 is attached to the upper rail 2 such that the LED 41 is positioned between the slide rail 3 and the moor 80. Even outside the slide rail 3, influence of disturbance light can be prevented by the moor 80.

The present disclosure is not limited to the embodiment described above and may be appropriately modified, improved, or the like. In addition, the material, shape, size, number, arrangement position and the like of each component in the embodiment described above are optional and are not limited as long as the present disclosure can be achieved.

Figure 7:
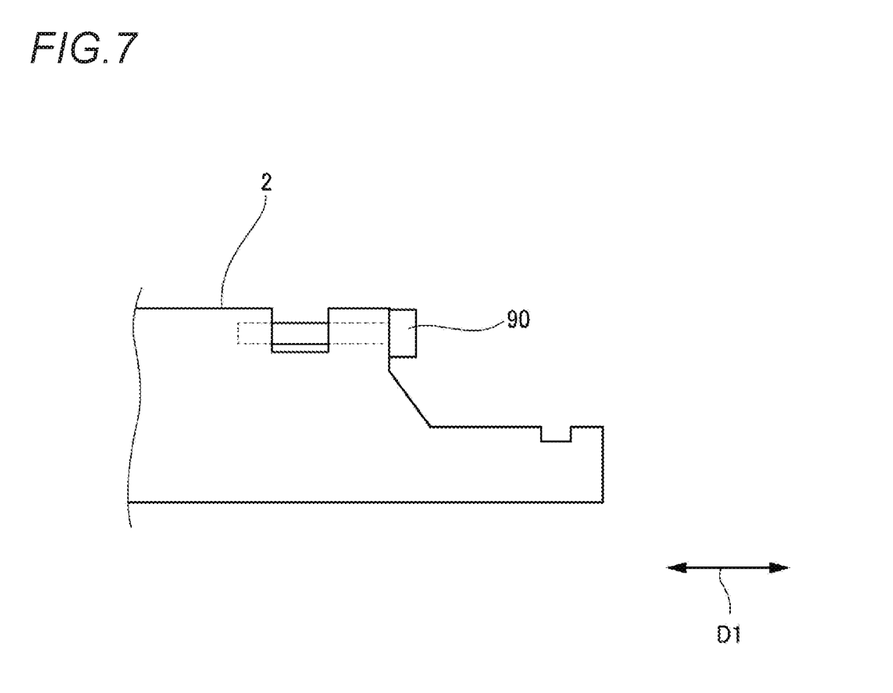
FIG. 7 is a side view of the upper rail illustrated in FIG. 1 according to another embodiment.
Figure 8:
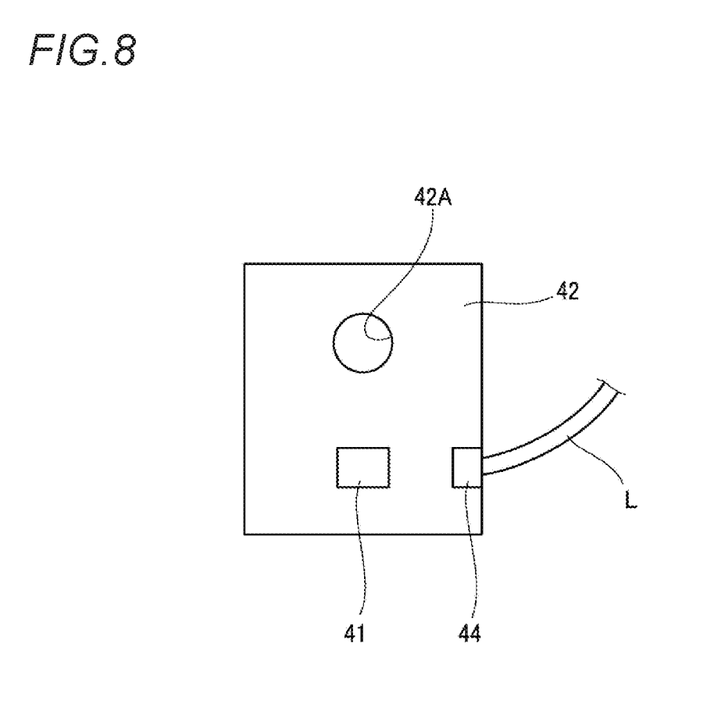
FIG. 8 is a front view of the light emitting device illustrated in FIG. 1 according to another embodiment.

That is, according to the embodiment described above, the holding portion 43 serving as an attachment portion is locked to the upper rail 2, and the present disclosure is not limited thereto. As illustrated in FIG. 7, a seat fixing bolt 90 is screwed to an end portion of the upper rail 2 along the longitudinal direction D1. When the slide seat 10 for the vehicle is fixed using the bolt 90, the LED 41 may be attached to the upper rail 2 using the bolt 90. In this case, as illustrated in FIG. 8, the attachment portion is configured with the substrate 42 on which the LED 41 is mounted, and a hole 42A through which the bolt 90 is passed is provided in the substrate 42. The bolt 90 may be fixed passing through the hole 42A.

Further, according to the embodiment described above, the LED 41 is disposed between the pair of inner walls 35, and the present disclosure is not limited thereto. The LED 41 may be attached to the upper rail 2 and disposed outside the slide rail 3, and may be disposed, for example, above one of the pair of upper walls 34.

Illustrative aspects according to the present disclosure is described hereinafter.

According to an illustrative aspect of the present disclosure, a slide device (1) includes an upper rail (2) to which a slide seat (10) for a vehicle is attached, a slide rail (3) to which the upper rail (2) is slidably attached, a light emitter (41), and an attachment portion (43) that attaches the light emitter (41) to the upper rail (2). The attachment portion (43) is attached to the upper rail (2) such that the light emitter (41) is arranged outside the slide rail (3).

According to another illustrative aspect of the present disclosure, the slide rail (3) includes a bottom wall (32) that is mounted on a floor (60), a pair of side walls (33, 33) that are vertically arranged from both sides of the bottom wall (32) extending in an orthogonal direction (D2) orthogonal to a sliding direction (D1) on the bottom wall (32) in which the upper rail (2) moves along the slide rail (3), a pair of upper walls (34, 34) that extend to approach each other from upper ends of the pair of side walls (33, 33) in an erecting direction (D4) in which the pair of side walls (33, 33) are vertically arranged, and a pair of inner walls (35, 35) that extend downward for the floor (60) from end portions of the pair of upper walls (34, 34), the end portions of the pair of upper walls (34, 34) being separated from the upper ends of the pair of side walls (33, 33) in a direction in which the pair of upper walls (34, 34) extend. The attachment portion (43) is attached to the upper rail (2) such that the light emitter (41) is arranged between the pair of inner walls (35, 35).

According to another illustrative aspect of the present disclosure, a cover member (80) that is arranged over the slide rail (3). The slide rail (3) includes a slit (31), and the cover member (80) covers the slit (31) of the slide rail (3). The upper rail (2) includes a slide portion (22) that is arranged inside the slide rail (3), and a seat attachment portion (21) that protrudes from inside the slide rail (3) to outside the slide rail (3) through the slit (31) of the slide rail (3), and to which the slide seat (10) for the vehicle is attached. The seat attachment portion (21) protrudes from below the cover member (80) to above the cover member (80) through the cover member (80). The attachment portion (43) is attached to the upper rail (2) such that the light emitter (41) is arranged between the slide rail (3) and the cover member (80).

According to another illustrative aspect of the present disclosure, a bolt (90) that is configured to attach the slide seat (10) for the vehicle is provided in the upper rail (2). A hole (42A) through which the bolt (90) is passed is formed in the attachment portion (43), and the attachment portion (43) is attached to the upper rail (2) with the bolt (90).

According to another illustrative aspect of the present disclosure, a light emitting device (4) for a slide device (1) includes a light emitter (41), and an attachment portion (43) that attaches the light emitter (41) to an upper rail (2) to which a slide seat (10) for the vehicle is attached. The attachment portion (43) is attached to the upper rail (2) such that the light emitter (41) is arranged outside a slide rail (3) to which the upper rail (2) is slidably attached.

What is claimed is:

1. A slide device, comprising:
   an upper rail to which a slide seat for a vehicle is attached;
   a slide rail to which the upper rail is slidably attached;
   a light emitter; and
   an attachment portion that attaches the light emitter to the upper rail,
   wherein the attachment portion is attached to the upper rail such that the light emitter is arranged outside the slide rail.

2. The slide device according to claim 1, wherein the slide rail includes a pair of inner walls vertically provided inside the slide rail, and
   wherein the attachment portion is attached to the upper rail such that the light emitter is arranged between the pair of inner walls.

3. The slide device according to claim 1, wherein the slide rail includes:
   a bottom wall that is mounted on a floor,
   a pair of side walls that are vertically arranged from both sides of the bottom wall extending in an orthogonal direction orthogonal to a sliding direction on the bottom wall in which the upper rail moves along the slide rail,
   a pair of upper walls that extend to approach each other from upper ends of the pair of side walls in an erecting direction in which the pair of side walls are vertically arranged, and
   a pair of inner walls that extend downward for the floor from end portions of the pair of upper walls, the end portions of the pair of upper walls being separated from the upper ends of the pair of side walls in a direction in which the pair of upper walls extend, and
   wherein the attachment portion is attached to the upper rail such that the light emitter is arranged between the pair of inner walls.

4. The slide device according to claim 1, further comprising:
   a cover member that is arranged over the slide rail,
   wherein the attachment portion is attached to the upper rail such that the light emitter is arranged between the slide rail and the cover member.

5. The slide device according to claim 1, further comprising:
   a cover member that is arranged over the slide rail,
   wherein the slide rail includes a slit, and the cover member covers the slit of the slide rail,
   wherein the upper rail includes:
      a slide portion that is arranged inside the slide rail, and
      a seat attachment portion that protrudes from inside the slide rail to outside the slide rail through the slit of the slide rail, and to which the slide seat for the vehicle is attached,
   wherein the seat attachment portion protrudes from below the cover member to above the cover member through the cover member, and
   wherein the attachment portion is attached to the upper rail such that the light emitter is arranged between the slide rail and the cover member.

6. The slide device according to claim 1, wherein a bolt that is configured to attach the slide seat for the vehicle is provided in the upper rail, and
   wherein a hole through which the bolt is passed is formed in the attachment portion, and the attachment portion is attached to the upper rail with the bolt.

7. A light emitting device for a slide device, comprising:
   a light emitter; and
   an attachment portion that attaches the light emitter to an upper rail to which a slide seat for the vehicle is attached,
   wherein the attachment portion is attached to the upper rail such that the light emitter is arranged outside a slide rail to which the upper rail is slidably attached.

* * * * *